(12) United States Patent
Gretz (10) Patent No.: US 8,067,703 B1
(45) Date of Patent: Nov. 29, 2011

(54) PROTECTIVE CABLE FRAME FOR USE WITH LOW VOLTAGE BRACKET OR ELECTRICAL BOX

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 414 days.

(21) Appl. No.: 12/456,560

(22) Filed: Jun. 18, 2009

(51) Int. Cl.
*H02G 3/18* (2006.01)

(52) U.S. Cl. .............. 174/659; 174/53; 174/66; 174/67; 220/241; 220/242

(58) Field of Classification Search .................. 174/53, 174/58, 63, 64, 66, 67, 61, 135, 665, 668, 174/72 A, 659; 220/241, 242, 3.2, 3.8; 439/131, 439/135, 144; 248/300, 342, 49, 48.1, 200; 385/134, 135; D13/155, 133, 154
See application file for complete search history.

(56) References Cited

U.S. PATENT DOCUMENTS

| | | | |
|---|---|---|---|
| 4,569,458 A | 2/1986 | Horsley | |
| 4,638,963 A * | 1/1987 | Hernandez | 248/56 |
| 4,688,747 A | 8/1987 | Helmsdorfer et al. | |
| 6,064,003 A | 5/2000 | Moore et al. | |
| 6,583,356 B2 * | 6/2003 | Arthur et al. | 174/659 |
| 6,793,524 B2 | 9/2004 | Clark et al. | |
| 7,048,575 B2 * | 5/2006 | Kidman | 174/53 |
| 7,282,642 B2 * | 10/2007 | Schmieta et al. | 174/66 |
| D559,656 S | 1/2008 | DeCosta | |
| 7,390,964 B2 | 6/2008 | Gorin et al. | |
| 7,399,920 B2 * | 7/2008 | Gorin et al. | 174/66 |
| 7,563,979 B1 * | 7/2009 | Gretz | 174/66 |
| D627,305 S * | 11/2010 | Gretz | D13/155 |
| 7,847,190 B1 * | 12/2010 | Gretz | 174/66 |
| 2008/0110886 A1 | 5/2008 | Provenzano et al. | |

* cited by examiner

*Primary Examiner* — Angel R Estrada (57) ABSTRACT

A protective cable frame for providing a portal for routing low voltage cables through a wall. The protective cable frame includes a substantially rectangular frame portion with an inner periphery having a rounded surface, two ends, and arms extending from each end. The arms include an outer bore and an inner slot therein. The inner slots enable insertion of fasteners for direct mounting of the cable frame to a low voltage bracket or an electrical box and permit squaring of the cable frame with respect to the wall. The outer bores in the arms of the protective cable frame enable receipt of fasteners for mounting a cover plate thereto. The protective cable frame is capable of receiving low voltage cables for routing them through a wall to an adjacent room. The rounded surface on the inner periphery provides a gentle bend radius to cables routed there through.

17 Claims, 8 Drawing Sheets

PROTECTIVE CABLE FRAME FOR USE WITH LOW VOLTAGE BRACKET OR ELECTRICAL BOX

FIELD OF THE INVENTION

This invention relates to the installation of low voltage wiring in buildings and specifically to a protective cable frame for use with a low voltage bracket or an electrical box in combination with a decorative cover plate for routing low voltage electrical cables or communications cables through walls.

BACKGROUND OF THE INVENTION

A wide variety of low voltage components such as telephone cables, coax cables for television and interne service, wiring for home entertainment systems and surround sound, and cables for connecting computers to peripherals such as printers and facsimile machines, are prevalent in today's homes and offices. Frequently it is necessary to route these low voltage wires and cables through walls in order to connect low voltage components in separate rooms.

In some cases, holes are simply made in the baseboard or walls and low voltage cables are simply routed through the holes. However, this is an unsightly solution and detracts from the overall appearance of the building.

U.S. patent application Ser. No. 12/384,423, sharing inventorship with the present invention, disclosed a cable routing assembly including a low voltage bracket and a scoop or frame for acting as a sight barrier for substantially blocking the view of low voltage or communication cables entering the wall.

Although several cable routing devices with sight barriers have been proposed for routing cables through walls, there are also situations in which the primary concern is accommodating a large number of cables and providing a safe opening through the wall. What is needed therefore is a cable routing device that provides an attractive wall portal for low voltage cables. The cable routing device should be capable of accommodating and supporting a large number of cables while providing a gradual or gentle bend radius to the cables passing through the device. The cable routing device should be easy to install and provide a cable portal that is visually pleasing to the homeowner.

SUMMARY OF THE INVENTION

The invention is a protective cable frame for providing a wall portal for routing low voltage cables there through. The protective cable frame includes a substantially rectangular frame portion with an inner periphery, an outer periphery, two ends, and arms extending from each end. The arms include an outer bore and an inner slot therein aligned along a vertical axis extending longitudinally through the cable frame. An ear extends outward laterally from each arm and includes apertures therein. The inner slots enable insertion of fasteners for direct mounting of the cable frame to a low voltage bracket or an electrical box and the width of the slots permit squaring of the cable frame with respect to the wall. The outer bores in the arms of the protective cable frame enable receipt of fasteners for mounting a cover plate thereto. An opening in the protective cable frame is capable of receiving low voltage cables for the purpose of routing them through the wall and into an adjacent room. A rounded surface is provided on the inner periphery of the cable frame to provide a gentle bend radius to any cables routed there through.

OBJECTS AND ADVANTAGES

Several advantages are achieved with the protective cable frame of the present invention, including:

(1) The protective cable frame provides a large portal for routing low voltage wires and cables through walls.
(2) The large portal is unimpeded by the cable shields or outward extending nose portions that are common on many prior art cable portal devices.
(3) The protective cable frame provides a cable portal with a broad cable support surface thereby preventing excessive bends on communication cables.
(4) The protective cable frame accommodates standard DECORA® cover plates, which is a registered trademark of and are available from Leviton Manufacturing Company, Little Neck, N.Y.
(5) As the protective cable frame is configured for use with conventional decorative cover plates, the protective cable frame for a single gang electrical box does not require the manufacture of a specially designed cover plate.
(6) The protective cable frame may be used to provide an insert for either a low voltage bracket or an electrical box.
(7) The protective cable frame provides a wide surface to convert conventional low voltage brackets or electrical boxes into acceptable cable portals.
(8) The protective cable frame provides an insert that completely covers the sharp edge surrounding the opening in a conventional decorative electrical cover.
(9) The protective cable frame includes a curved surface on its inner periphery that provides a gradual bend radius to any cables extending there across thereby protecting the cables from abrasion and excessive bends.

These and other objects and advantages of the present invention will be better understood by reading the following description along with reference to the drawings.

| INDEX TO REFERENCE NUMERALS IN DRAWINGS | |
|---|---|
| 20 | protective cable frame |
| 22 | frame member |
| 24 | end of frame member |
| 26 | arm |
| 28 | frame opening |
| 30 | inner periphery |
| 32 | outer periphery |
| 34 | outer bore |
| 36 | inner slot |
| 38 | central axis |
| 40 | longitudinal flange |
| 42 | forward peripheral flange |
| 44 | front edge |
| 46 | rearward peripheral flange |
| 48 | rear edge |
| 50 | flat center portion |
| 51 | curved surface |
| 52 | cable support surface |
| 53 | ear |
| 54 | aperture |
| 56 | curved shoulder |
| 58 | curved inner corner |
| 60 | side of arm |
| 62 | countersunk area |
| 64 | cover plate |
| 66 | back side of cover member |
| 68 | peripheral wall of cover plate |
| 70 | recessed area |
| 72 | low voltage mounting bracket |
| 74 | wall |
| 76 | inner aperture |
| 78 | outer aperture |
| 79 | face flange |
| 80 | rotatable flag |
| 82 | fastener |
| 84 | fastener |
| 86 | aperture in cover plate |
| 88 | sharp edge around cover opening |
| 90 | cover opening |
| 92 | electrical box |
| 94 | aperture in electrical box |
| 96 | wallboard |
| 97 | axis |
| D1 | distance peripheral flanges extend from longitudinal flange |
| D2 | depth of recessed area of cover plate |
| R1 | radius of curved surface of cable support |
| T1 | thickness of arm portion of protective cable frame |
| W1 | width across frame member |

DETAILED DESCRIPTION OF THE INVENTION

Figure 1:
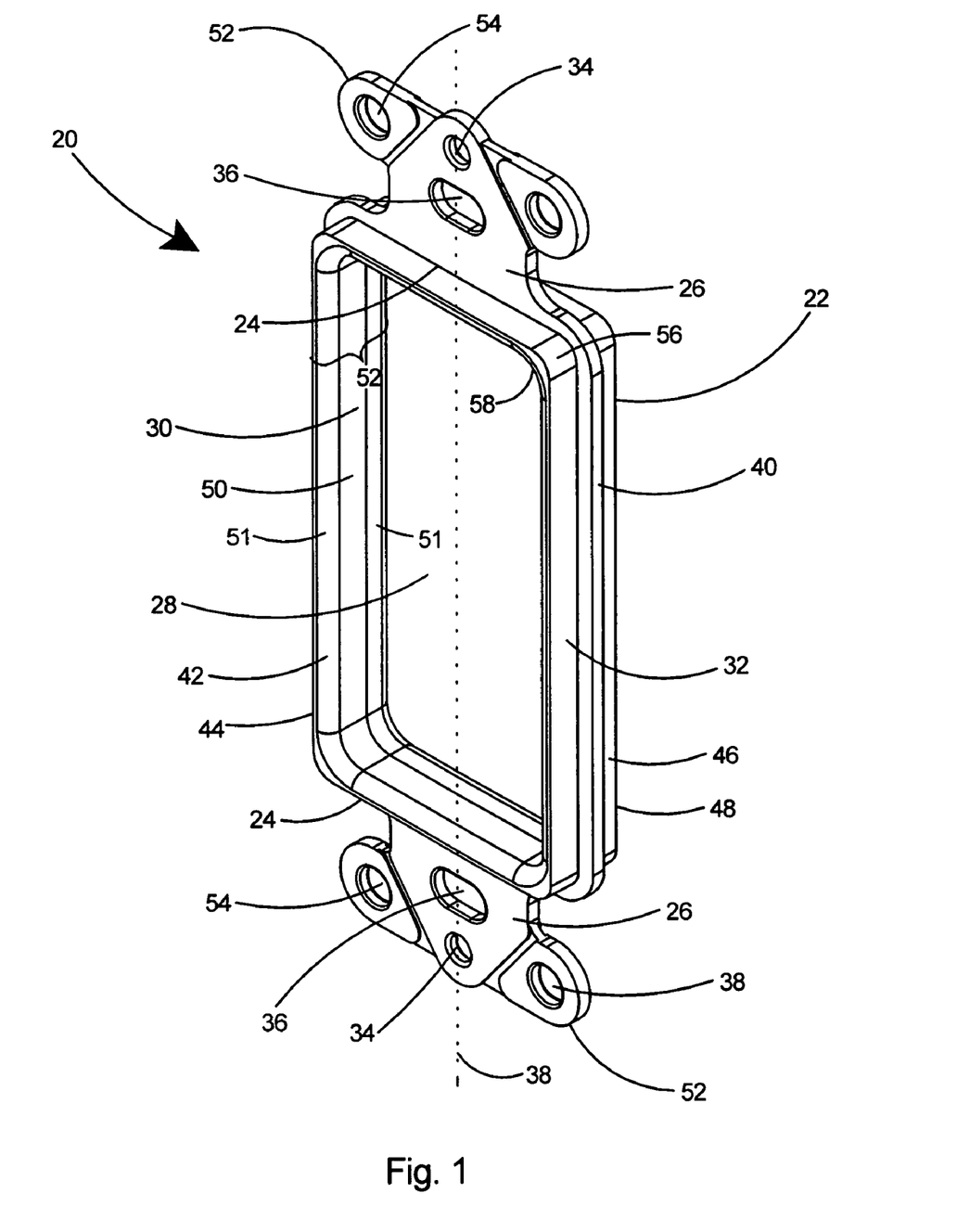
FIG. 1 is a perspective view of the preferred embodiment of a protective cable frame according to the present invention.

Referring to FIG. 1 there is shown a preferred embodiment of a protective cable frame 20 according to the present invention. The protective cable frame 20 includes a one-piece frame member 22 with two ends 24, an arm 26 extending from each end 24, and an frame opening 28 therein. The frame member 22 includes an inner periphery 30 surrounding the frame opening 28 and an outer periphery 32. The protective cable frame 20 includes an outer bore 34 and an inner slot 36 aligned along a central longitudinal axis 38 through the frame member 22. A longitudinal flange 40 extends outward from and around the outer periphery 32 of the frame member 22. A forward peripheral flange 42 extends forward from the longitudinal flange 40 to a front edge 44 and a rearward peripheral flange 46 extends rearward from the longitudinal flange 40 to a rear edge 48. The inner periphery 30 of the protective cable frame 20 includes a flat center portion 50 and two curved surfaces 51 extending away from the center 50 to the front edge 44 to the rear edge 48. The entire surface of the inner periphery 30 including the flat center 50 and curved surfaces 51 combine to form a broad cable support surface 52 that extends around the entire inner periphery 30 and will support any cables (not shown) inserted there through thereby providing a gentle bend radius to the inserted cables.

Figure 2:
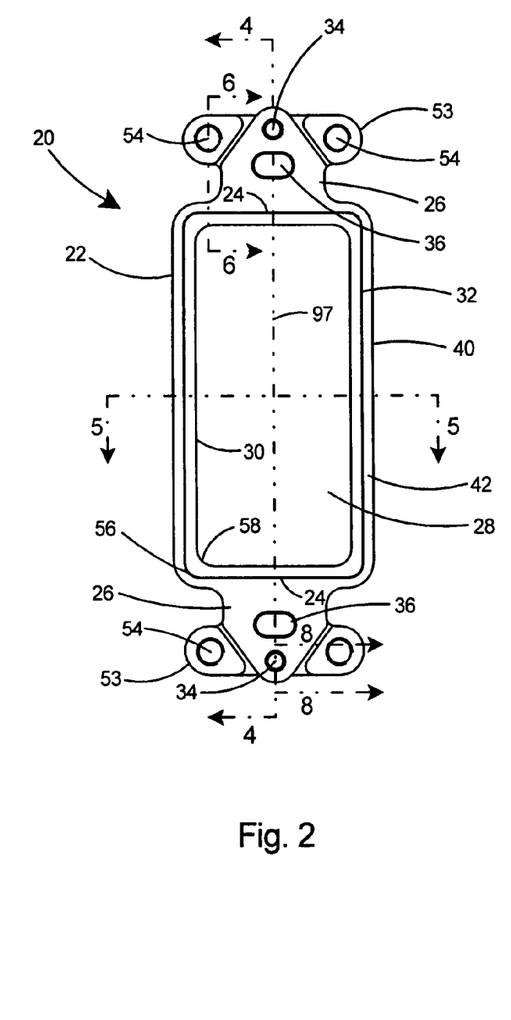
FIG. 2 is a front elevation view of the protective cable frame of FIG. 1.
Figure 3:
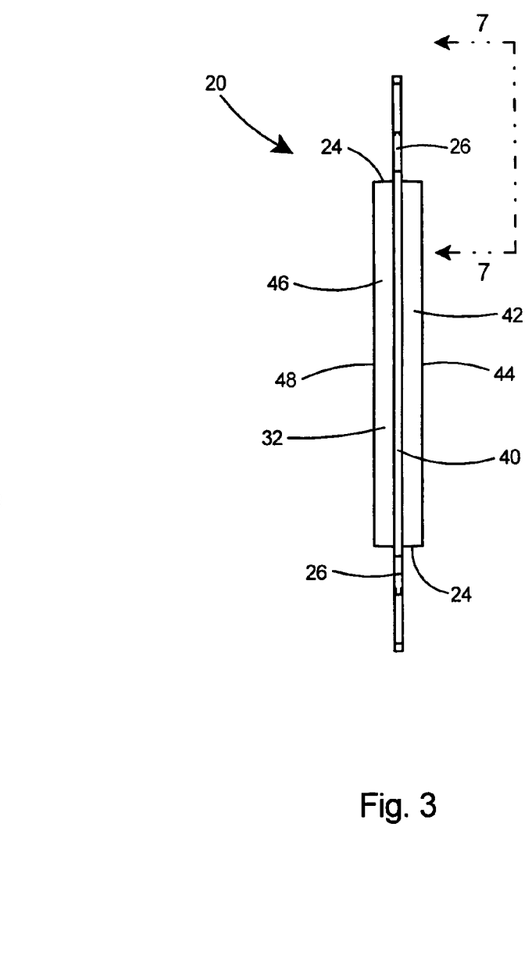
FIG. 3 is a side view of the protective cable frame of FIG. 1.

With reference to FIGS. 2 and 3, the protective cable frame 20 includes two ears 53 extending from each of the arms 26. Each of the ears 53 includes apertures 54 therein. As shown in the front view of the protective cable frame 20 in FIG. 2, the frame member 22 includes four curved shoulders 56 and curved inner corners 58 on the inner periphery 30 surrounding the frame opening 28. As shown in FIG. 3, the longitudinal flange 40 is coplanar with each of the arms 26 and extends around the outer periphery 32 of the frame member 22.

Figure 4:
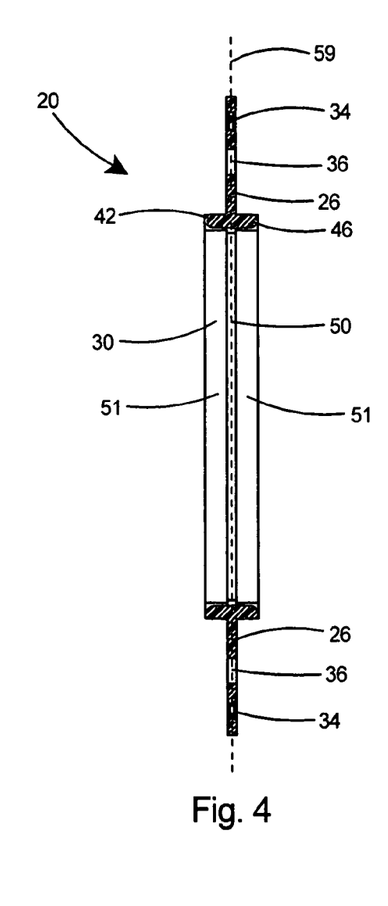
FIG. 4 is a sectional view of the protective cable frame taken along line 4-4 of FIG. 2.
Figure 5:
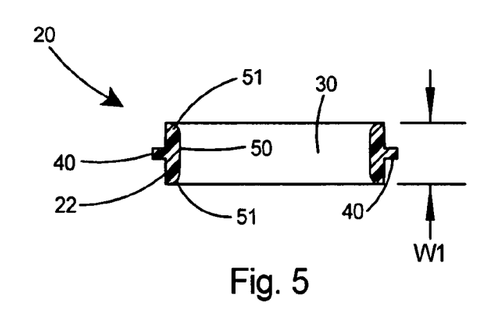
FIG. 5 is a sectional view of the protective cable frame taken along line 5-5 of FIG. 2.
Figure 6:
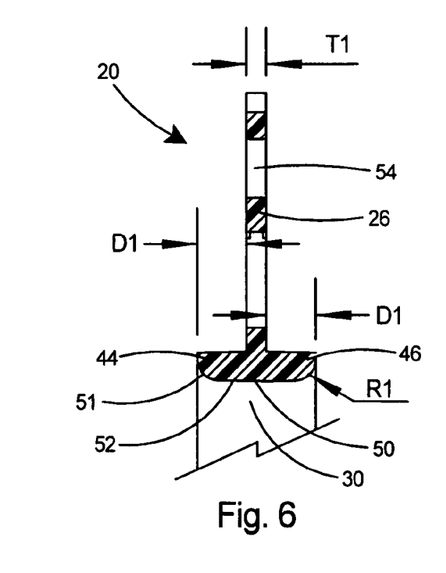
FIG. 6 is a sectional view of the protective cable frame taken along line 6-6 of FIG. 2.

Referring to FIGS. 4-6, the inner periphery 30 of the protective cable frame 20 includes flat center portion 50 and curved surfaces 51 sloping away from center 50. Preferably the width W1 across the frame member 22, as shown in FIG. 5, is no less than 0.35 inch. The wide width of the inner periphery 30 of the frame member 22 provides substantially greater support to any cables (not shown) that are fed through the protective cable frame 20. Preferably, as shown in FIG. 4, protective cable frame 20 is symmetrical about central axis 59 and thus forward peripheral flange 42 and rearward peripheral flange 46 both extend the same distance as shown by D1 in FIG. 6. Thus, as the sides of the protective cable frame 20 are mirror images, when placed in operation the protective cable frame 20 can be reversed. As shown in FIG. 6, the entire surface of the inner periphery 30 includes the flat center 50 and curved surfaces 51 that combine to form a broad cable support surface 52 that will support any cables inserted there through and will provide a gentle bend radius to the inserted cables. Preferably the radius (see R1 in FIG. 6) of the curved surface 51 is no less than 0.06 inch and the width of the cable support surface is no less than 0.35 inch. In order to enable the arms 26 to fit within the recessed area of a conventional decorative cover plate (see FIG. 12), the thickness T1 of the arms 26 and the thickness of the longitudinal flange 40 are equal and are preferably no greater than 0.059 inch.

Figure 7:
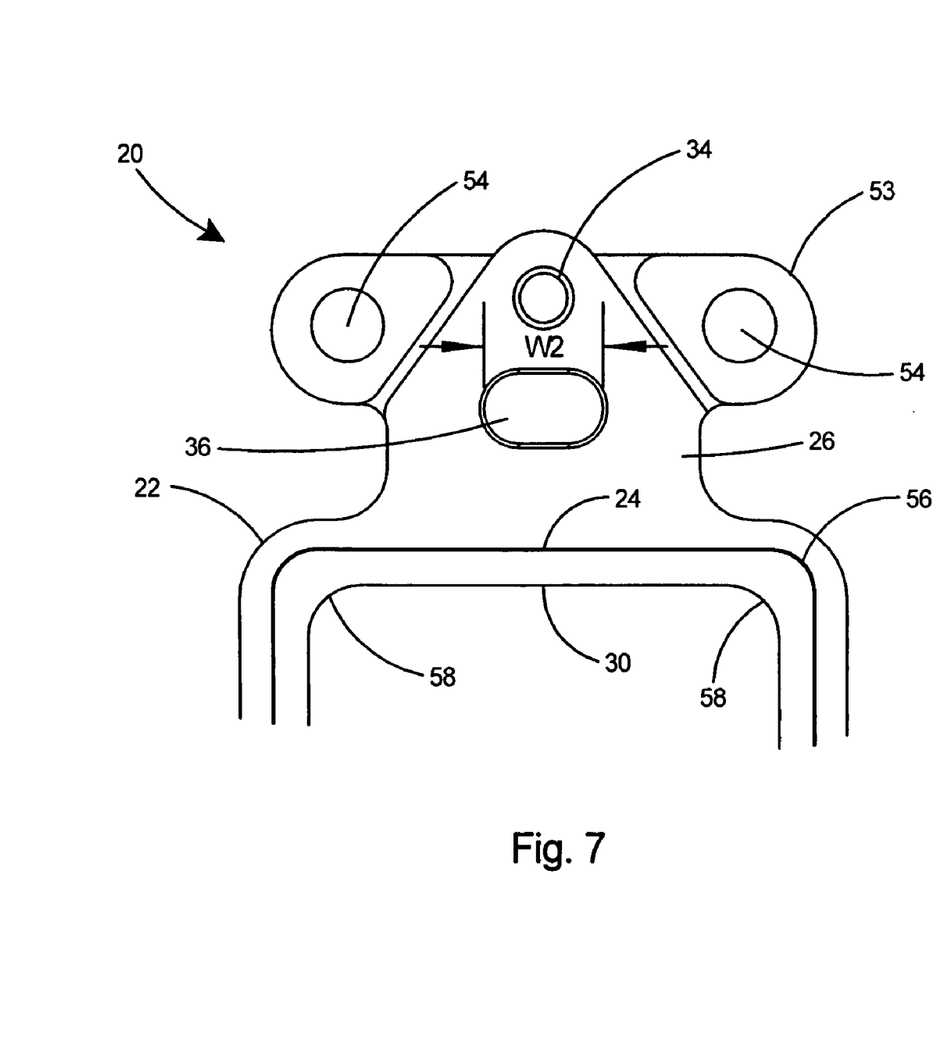
FIG. 7 is a detailed view of a portion of the protective cable frame as viewed along line 7-7 of FIG. 3.
Figure 8:
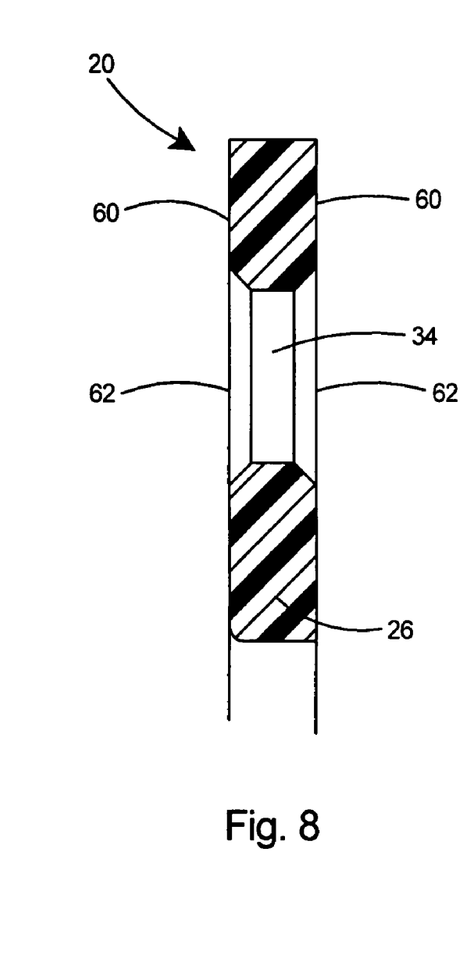
FIG. 8 is a sectional view of the protective cable frame taken along line 8-8 of FIG. 2.

With reference to FIG. 7, the curved inner corners 58 of the frame member 22 portion of the protective cable frame 20 provide gently curved surfaces at each corner of the frame member 22 to cover the sharp edges and 90-degree corners inherent in a conventional decorative cover plate (not shown). As shown in FIG. 8, the arms 26 of the protective cable frame 20 include two sides 60 and the outer bore 34 in each arm 26 includes a countersunk area 62 on each side 60. Providing a countersunk area 62 on each side 60 of each arm 26 further contributes to the reversibility of the protective cable frame 20. It is important that inner slots 36 are wide enough to enable alignment and squaring of the protective cable frame 20 in order that a cover (not shown) that is later secured to the protective cable frame 20 is square with the wall. Preferably the inner slots 36 include a width no less than 0.57 inch to enable squaring of the protective cable frame 20 with respect to the wall.

Figure 9:
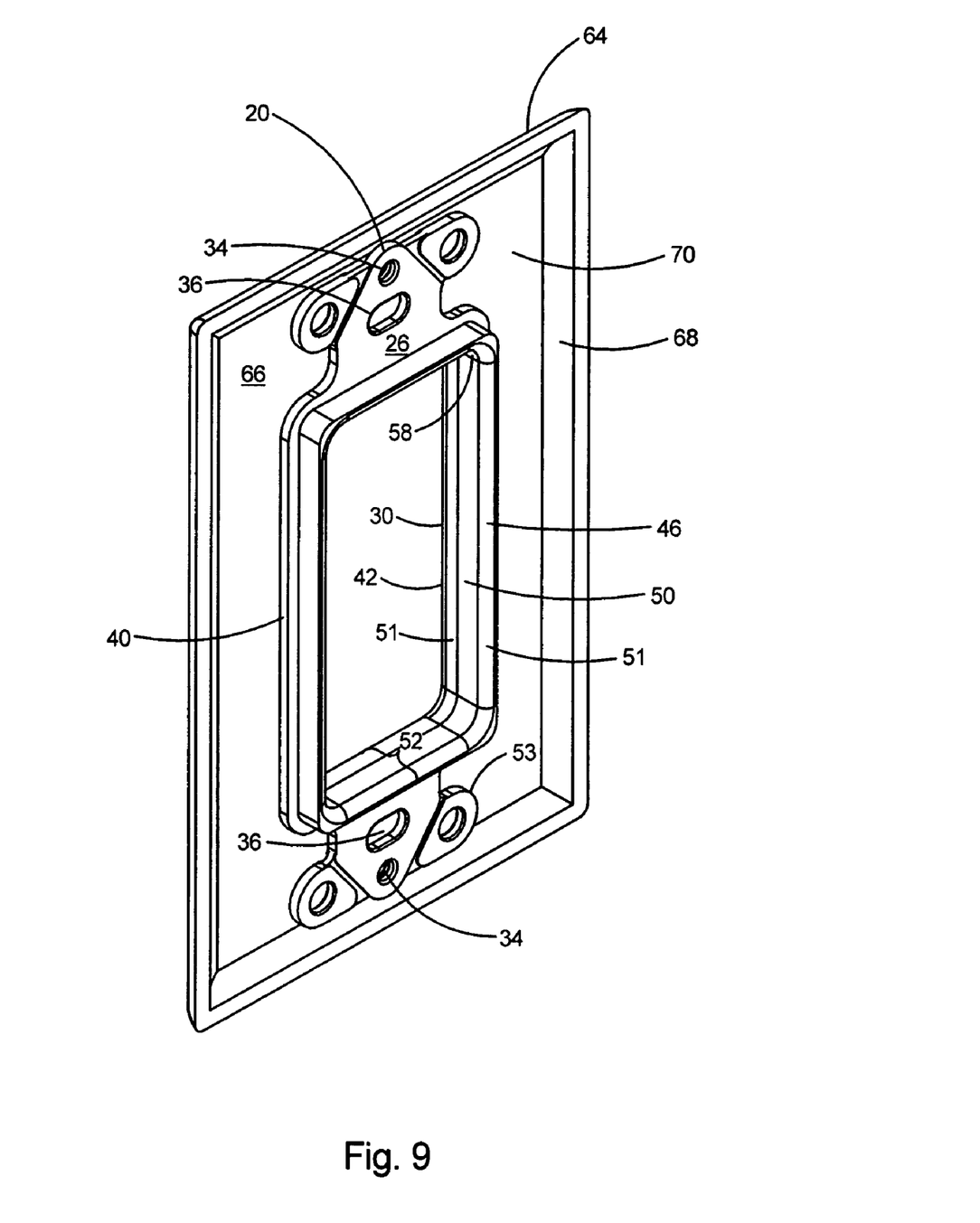
FIG. 9 is a rear perspective view of the protective cable frame of the present invention flush against the back of a cover plate.

With reference to FIG. 9, there is shown a protective cable frame 20 according to the present invention in relationship to a conventional decorative cover plate 64 that it is used in conjunction with. When fitted flush against the back side 66 of the cover plate 64 the outer bores 34 of the protective cable frame 20 will align with the apertures (not shown) in the cover plate 64. The decorative cover plate 64 includes a peripheral wall 68 around its outer periphery that creates a recessed area 70 on the back side 66 of the plate. Forward peripheral flange 42 of protective cable frame 20 nests within the opening of the cover plate 64 thereby covering the sharp edges of the cover plate 64 and providing a broad cable support surface 52 for cables (not shown) to rest on.

Figure 10:
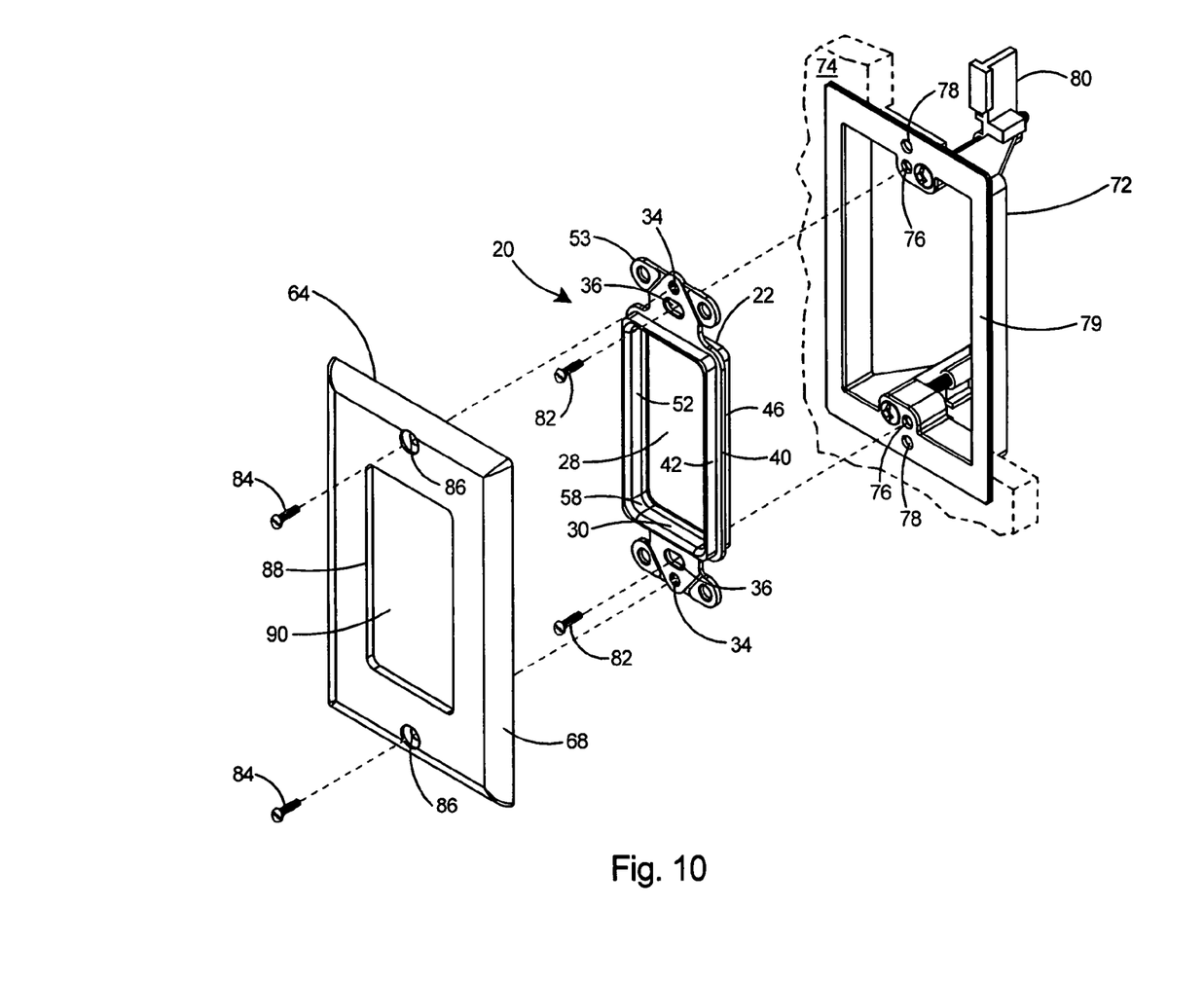
FIG. 10 is an exploded perspective view of the protective cable frame of the present invention in alignment with a low voltage mounting bracket and a cover plate for attachment to a wall.

Referring to FIG. 10, the protective cable frame 20 is shown in alignment with a low voltage mounting bracket 72 and a decorative cover plate 64 for attachment to a wall 74. The low voltage mounting bracket 72 includes inner apertures 76, outer apertures 78, a face flange 79, and rotatable flags 80 for securing the low voltage mounting bracket 72 to the wall 74.

For operation of the protective cable frame 20 of the present invention with a low voltage mounting bracket, reference is made to FIG. 10. Low voltage mounting bracket 72 is first secured to the wallboard in an opening in wall 74. Protective cable frame 20 is then secured to low voltage mounting bracket 72 with fasteners 82 secured through inner slots 36 of frame member 22 into inner apertures 76 of low voltage mounting bracket 72. Wide inner slots 36 enable adjustment of the alignment of protective cable frame 20 with respect to the wall 74 to compensate for any misalignment of the low voltage mounting bracket 72 with respect to the wall 74. After protective cable frame 20 is secured to the low voltage mounting bracket 72 and the wall 74, fasteners 84 are secured through apertures 86 in cover plate 64 into outer bores 34 in protective cable frame 20 to secure the cover plate 64 to the protective cable frame 20 and thus to the low voltage mounting bracket 72 and the wall 74. Protective cable frame 20, being symmetric from side to side as described hereinabove, is reversible, thus simplifying installation in the field as an electrical installer does not need to be concerned about which side needs to face in or out. The inner periphery 30 of protective cable frame 20 will present a broad cable support surface 52 to any cables (not shown) inserted within the frame opening 28 thereby covering sharp edges 88 surrounding the opening 90 in the cover plate 64 and providing a gradual or gentle bend radius to any cables passing through the frame opening 28 of the protective cable frame 20.

Figure 11:
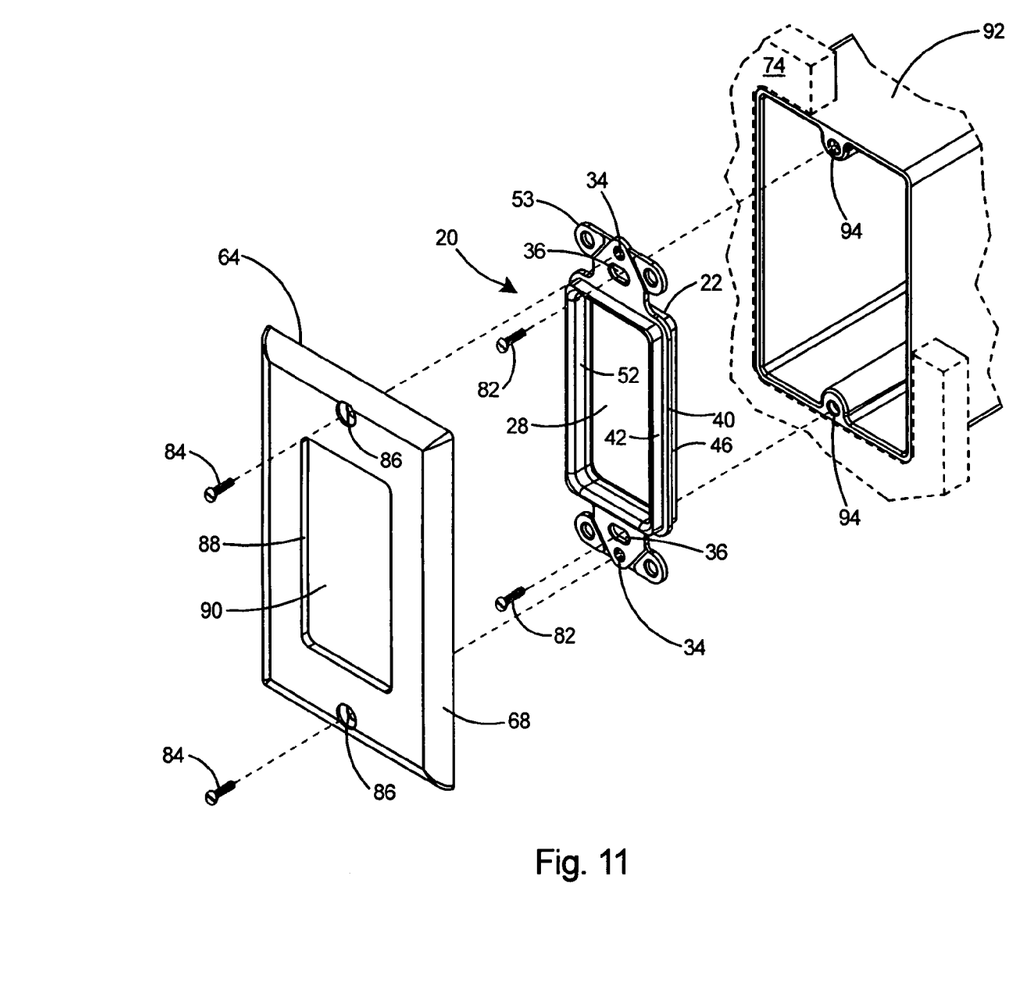
FIG. 11 is an exploded perspective view of the protective cable frame of the present invention in alignment with an electrical box and a cover plate for attachment to a wall.

For operation of the protective cable frame 20 of the present invention with a conventional electrical box, reference is made to FIG. 11. The electrical box 92 can be an old work box or a newly installed electrical box. One or more knockout areas (not shown) within the electrical box 92 may be removed to enable cables to pass through the electrical box. Protective cable frame 20 is secured to electrical box 92 with fasteners 82 secured through inner slots 36 of frame member 22 into apertures 94 in the electrical box 92. The wide inner slots 36 enable adjustment of the alignment of protective cable frame 20 with respect to the wall 74 to compensate for any misalignment of the electrical box 92 with respect to the wall 74. After protective cable frame 20 is secured to the electrical box 92 and the wall 74, fasteners 84 are secured through apertures 86 in cover plate 64 into outer bores 34 in protective cable frame 20 to secure the cover plate 64 to the protective cable frame 20 and thus to the electrical box 92 and the wall 74. In the same manner as for the low voltage mounting bracket described hereinabove, the inner periphery 30 of protective cable frame 20 presents a broad cable support surface 52 to any cables (not shown) inserted within the frame opening 28 thereby covering sharp edges 88 surrounding the opening 90 in the cover plate 64 and providing a gradual or gentle bend radius to any cables passing through the protective cable frame 20 and through the electrical box 92.

Figure 12:
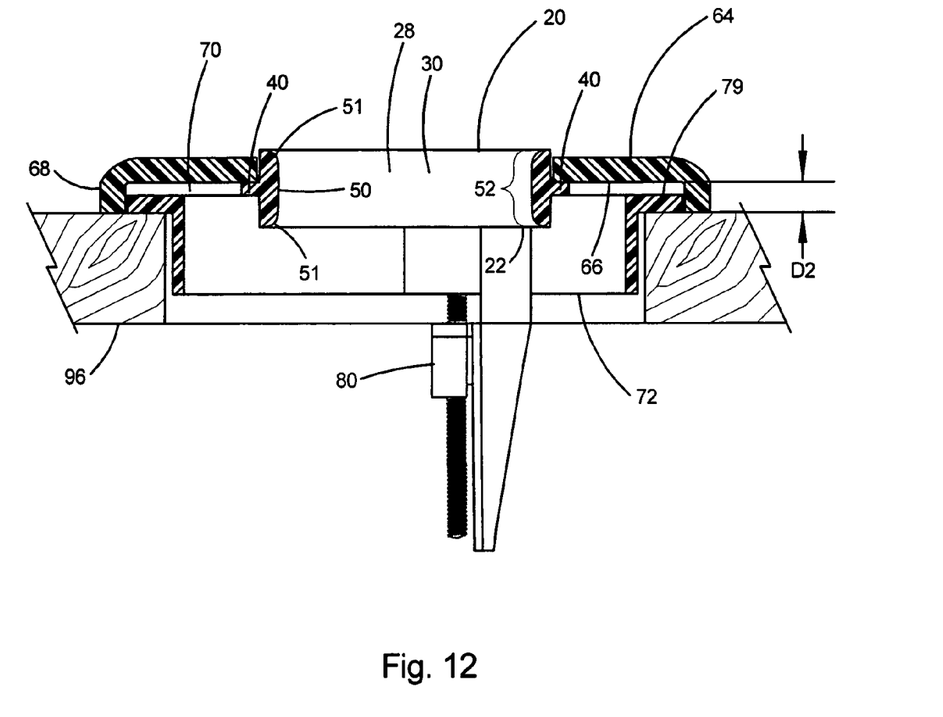
FIG. 12 is a sectional view of the protective cable frame of the present invention secured to a low voltage bracket and a cover plate to form a cable portal through a wall.

With reference to FIG. 12, the protective cable frame 20 of the present invention is depicted in sectional view after being secured to sheetrock or wallboard 96. The depth D2 of the recessed area 70 of cover plate 64 is sufficient to accommodate nesting of both the protective cable frame 20 and face flange 79 of the low voltage mounting bracket 72 within the recessed area 70. Thus, when cover plate 64 is secured to the protective cable frame 20, peripheral wall 68 of cover plate 64 is pulled flush against the wallboard 96 and recessed area 70 is large enough to accommodate longitudinal flange 40 of protective cable frame 20 and the face flange 79 of the low voltage mounting bracket 72. The inner periphery 30 of the protective cable frame 20 includes a center a curved surface 51 extending away from each side of the center 50, the curved surfaces 51 providing a gradual bend radius to any cables (not shown) that are extended through the frame opening 28 of the protective cable frame 20. The longitudinal flange 40 of the protective cable frame 20 fits entirely within the recessed area 70 of a conventional decorative electrical box cover plate 64 when the cover plate 64 is secured to the protective cable frame 20.

With reference to FIG. 2, in a protective cable frame 20 according to the present invention it is important that the outer bores 34 in the frame member 22 are aligned along a central axis 97 and the outer bores 34 include a spacing and pattern to match the spacing and pattern of the apertures 86 in a conventional decorative electrical box cover plate 64 as shown in FIG. 10. It is also important that the inner slots 36 in the frame member 22 are aligned along the central axis 97 and the inner slots 36 include a spacing and pattern to match the spacing and pattern of the apertures 76 in a conventional low voltage bracket 72 as shown in FIG. 10 or the apertures 94 in a conventional electrical box 92 as shown in FIG. 11.

Most preferably, the one-piece frame member 22 of the protective cable frame 20 is molded in one piece of plastic. Preferably, the plastic is polycarbonate, polyvinyl chloride, acrylonitrile-butadiene styrene, or polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A protective cable frame for use with a low voltage bracket or electrical box for providing a portal for routing low voltage cables through a wall comprising:
   a substantially rectangular shaped one-piece frame member including two ends, an arm extending from each of said ends, and an opening therein;
   said frame member including an inner periphery surrounding said opening and an outer periphery;
   an outer bore and an inner slot aligned along a central longitudinal axis through said frame member;
   a longitudinal flange extending around said outer periphery of said frame member;
   said frame member including a forward peripheral flange extending to a front edge and a rearward peripheral flange extending to a rear edge; and
   a substantially broad curved surface on said inner periphery of said frame member extending from said front edge to said rear edge.

2. The protective cable frame of claim 1 wherein said longitudinal flange is coplanar with each of said arms.

3. The protective cable frame of claim 1 including two ears extending from each of said arms.

4. The protective cable frame of claim 3 wherein each of said ears include apertures therein.

5. The protective cable frame of claim 1 including
curved shoulders on said frame member;
a flat center portion on said inner periphery of said frame member; and
curved inner corners on said inner periphery of said frame member.

6. The protective cable frame of claim 1 wherein
said arm includes two sides; and
said outer bore in said arms includes a countersunk area on each of said sides of said arms.

7. The protective cable frame of claim 1 wherein said arms include a width no greater than 0.059 inch.

8. The protective cable frame of claim 1 wherein said longitudinal flange includes a width no greater than 0.059 inch.

9. The protective cable frame of claim 1 wherein said broad curved surface includes a width no less than 0.35 inch.

10. The protective cable frame of claim 1 wherein said broad curved surface includes a radius no less than 0.06 inch.

11. The protective cable frame of claim 1 wherein
said outer bores in said frame member are aligned along a central axis; and
said outer bores in said frame member of a spacing and pattern to match the spacing and pattern of the apertures in a conventional decorative electrical box cover plate.

12. The protective cable frame of claim 1 wherein
said inner slots in said frame member are aligned along a central axis; and
said inner slots in said frame member of a spacing and pattern to match the spacing and pattern of the apertures in a conventional low voltage bracket or electrical box.

13. The protective cable frame of claim 1 wherein said inner slots include a width of at least 0.57 inch.

14. The protective cable frame of claim 1 wherein said one-piece frame member is molded in one piece of plastic.

15. The protective cable frame of claim 14 wherein said plastic is selected from the group including polycarbonate, polyvinyl chloride, acrylonitrile-butadiene styrene, and polyethylene.

16. The protective cable frame of claim 1 wherein said inner periphery of said protective cable frame includes a center a curved surface extending away from each side of said center, said curved surfaces providing a gradual bend radius to any cables extended through said opening of said protective cable frame.

17. The protective cable frame of claim 1 wherein said longitudinal flange and said forward peripheral flange of said protective cable frame fit entirely within a recessed area of a conventional decorative electrical box cover plate when said cover plate is secured to said protective cable frame.

* * * * *